(12) United States Patent
Nelissen

(10) Patent No.: US 10,045,554 B2
(45) Date of Patent: Aug. 14, 2018

(54) APPARATUS FOR COOKING AN EGG USING MICROWAVE RADIATION

(71) Applicant: NEWTRICIOUS B.V., AL Oirlo (NL)

(72) Inventor: Jos Nelissen, AL Oirlo (NL)

(73) Assignee: NEWTRICIOUS B.V., AL Oirlo (NL)

( * ) Notice: Subject to any disclaimer, the term of this patent is extended or adjusted under 35 U.S.C. 154(b) by 0 days.

(21) Appl. No.: 14/798,672

(22) Filed: Jul. 14, 2015

(65) Prior Publication Data

US 2015/0374023 A1 Dec. 31, 2015

Related U.S. Application Data

(62) Division of application No. 13/806,467, filed as application No. PCT/NL2011/050473 on Jun. 30, 2011, now Pat. No. 9,108,788.

(30) Foreign Application Priority Data

Jul. 2, 2010 (EP) .................................. 10168243

(51) Int. Cl.
*H05B 6/64* (2006.01)
*H05B 6/50* (2006.01)
(Continued)

(52) U.S. Cl.
CPC ........ *A23L 1/32* (2013.01); *A23L 5/13* (2016.08); *A23L 5/15* (2016.08); *A23L 15/00* (2016.08);
(Continued)

(58) Field of Classification Search
None
See application file for complete search history.

(56) References Cited

U.S. PATENT DOCUMENTS 3,216,182 A 11/1965 Cochran et al.
3,851,571 A * 12/1974 Nichols .................. A23B 5/043
206/216
(Continued)

FOREIGN PATENT DOCUMENTS

CN 2662782 12/2004
CN 2720945 8/2005
(Continued)

OTHER PUBLICATIONS

Malmberg et al (J of Research of the National Bureau of Standards, vol. 56. No. 1, Jan. 1956, paper 2641).*
(Continued)

*Primary Examiner* — David Angwin
*Assistant Examiner* — Gyounghyun Bae
(74) *Attorney, Agent, or Firm* — Barnes & Thornburg LLP

(57) ABSTRACT

The invention relates to an apparatus for boiling an egg, comprising a device for providing microwave radiation in a confined space, comprising a holder with at least one cavity adapted to the shape of an egg with an eggshell, said cavity provided with a first layer surrounding the eggshell, said first layer: —is in heat exchanging contact with the shell of the egg; —has a dielectric constant with an imaginary part, ε", between 20-500 at a temperature between 0° C.-100° C. and at a microwave frequency of 2.45 GHz, and—having a layer thickness d of 1-6 millimeter and varying less than 30% over the egg, or said holder for holding at least one egg assembly adapted for cooking an egg using microwave radiation.

2 Claims, 4 Drawing Sheets

(51) Int. Cl.
  *H05B 6/80* (2006.01)
  *H05B 6/74* (2006.01)
  *A23L 1/32* (2006.01)
  *A47J 29/02* (2006.01)
  *B65D 81/34* (2006.01)
  *A23L 5/10* (2016.01)
  *A23L 15/00* (2016.01)

(52) U.S. Cl.
  CPC ......... *A47J 29/02* (2013.01); *B65D 81/3446* (2013.01); *H05B 6/80* (2013.01); *A23V 2002/00* (2013.01)

(56) References Cited

U.S. PATENT DOCUMENTS

| | | | |
|---|---|---|---|
| 4,133,996 A * | 1/1979 | Fread | A47J 29/00 219/729 |
| 4,280,032 A | 7/1981 | Levinson | |
| 4,413,167 A | 11/1983 | Martel et al. | |
| 4,439,656 A * | 3/1984 | Peleg | A23L 3/01 219/731 |
| 4,501,946 A * | 2/1985 | Nibbe | A47J 29/00 219/729 |
| 4,529,089 A * | 7/1985 | Gasbarra | B65D 81/3407 206/525 |
| 4,617,860 A | 10/1986 | Blaylock | |
| 4,874,917 A * | 10/1989 | Weimer | A23G 9/48 219/728 |
| 4,908,487 A | 3/1990 | Sarnoff et al. | |
| 4,988,841 A * | 1/1991 | Pesheck | A23G 9/48 219/728 |
| 5,012,212 A | 4/1991 | Matsui et al. | |
| 5,140,121 A * | 8/1992 | Pesheck | A23G 9/48 219/729 |
| 5,293,021 A * | 3/1994 | Davis | A47J 29/00 219/728 |
| 5,864,123 A * | 1/1999 | Keefer | B65D 81/3446 219/728 |
| 5,889,264 A | 3/1999 | Kidblad et al. | |
| 6,303,915 B1 | 10/2001 | Young et al. | |
| 6,306,448 B1 | 10/2001 | Martuch et al. | |
| 6,329,004 B1 | 12/2001 | Fernandez | |
| 6,691,563 B1 | 2/2004 | Trabelsi et al. | |
| 7,180,034 B1 | 2/2007 | Oppenheimer | |
| 9,003,959 B2 * | 4/2015 | Frenkil, Sr. | A47J 29/06 99/345 |
| 2002/0020701 A1 | 2/2002 | Aubert | |
| 2003/0054076 A1 | 3/2003 | Dibbs et al. | |
| 2003/0183625 A1 * | 10/2003 | Hoh | A47J 36/027 219/732 |
| 2004/0047956 A1 * | 3/2004 | Braeken | A23B 5/0052 426/298 |
| 2005/0061813 A1 | 3/2005 | Vilalta et al. | |
| 2005/0120892 A1 | 6/2005 | McKee | |
| 2006/0257090 A1 | 11/2006 | Podolskiy et al. | |
| 2006/0265155 A1 | 11/2006 | Goldfine et al. | |
| 2007/0202224 A1 * | 8/2007 | Erasmus | A23B 5/005 426/298 |
| 2007/0205210 A1 | 9/2007 | Powell | |
| 2007/0265523 A1 * | 11/2007 | Pahlsson | H05B 6/062 600/412 |
| 2008/0129453 A1 | 6/2008 | Shanks et al. | |
| 2009/0236334 A1 | 9/2009 | Ben-Shmuel et al. | |

FOREIGN PATENT DOCUMENTS

| | | |
|---|---|---|
| DE | 3601406 | 7/1987 |
| DE | 19738380 | 3/1999 |
| EP | 0274210 A1 | 7/1988 |
| EP | 0992197 | 4/2000 |
| EP | 1166654 | 1/2002 |
| EP | 1917867 | 5/2008 |
| EP | 0988795 | 3/2009 |
| JP | 60-30730 U | 3/1985 |
| JP | 60126062 | 7/1985 |
| JP | 3-240465 A | 10/1991 |
| JP | 4-121832 U | 10/1992 |
| JP | 10-52242 A | 2/1998 |
| JP | 2002-360430 A | 12/2002 |
| JP | 2003-79513 A | 3/2003 |
| JP | 2004215948 A | 8/2004 |
| JP | 2005287331 | 10/2005 |
| JP | 2009196652 | 9/2009 |
| WO | 01/35804 | 5/2001 |
| WO | 2011108922 | 9/2011 |

OTHER PUBLICATIONS

Bruijn et al (Optics communications, vol. 2, No. 56., p. 425-432).*
Kuo et al (2007 IEEE, Jan. 1-4244-0878-4/07/$20.00, p. 1785-1788).*
Pereverzeva et al (1996 IEEE, 0-7803-3355-1/96/$5.00, p. 841-843).*
PCT International Search Report and Written Opinion issued in connection with PCT/NL2011/050473 and completed by the ISA/EP dated Jul. 27, 2011.
Extended EP Search Report issued in connection with EP 10168243.3 and dated Jan. 4, 2011.
Dev. et al. "Dielectric Properties of Egg Components and Microwave Heating for In-Shell Pasteurization of Eggs" Journal of Food Engineering, Barking, Essex, GB, vol. 86, No. 2, Dec. 20, 2007, pp. 207-214.
Wang, et al. "Dielectric Properties of Egg Whites and Whole Eggs as Influenced by Thermal Treatments" Lebensmittel Wissenschaft Und Technologie, Academic Press, London, GB, vol. 42, No. 7, Sep. 1, 2009, pp. 1204-1212.
International Search Report dated May 27, 2011, for PCT/NL2011/050143.
Let your Microwave be your 'Quick Egg Boiler,' Geetanjali Singh, Hometone, Dec. 29, 2007.
Microwave egg-boiler, boingboing, Cory Doctorow, XP-002600566, Nov. 16, 2006.
Mordic Ware Microwave Egg Boiler Reviews, XP-002600567, Jun. 13, 2007.

* cited by examiner

APPARATUS FOR COOKING AN EGG USING MICROWAVE RADIATION

CROSS-REFERENCE TO RELATED APPLICATIONS

This application is a divisional of pending U.S. patent application Ser. No. 13/806,467, filed Apr. 12, 2013, which is a U.S. national counterpart application of international application Serial No. PCT/NL2011/050473 filed Jun. 30, 2011, which claims priority to European Application No. 10168243.3 filed Jul. 2, 2010. The entire disclosures of PCT/NL2011/050473 and European Patent Application No. 10168243.3 are hereby incorporated by reference

BACKGROUND

The present invention relates to an apparatus for cooking an egg using microwave radiation.

Preparing an egg by boiling the egg in water of about 100 degrees Celsius usually takes about 3.5-4 minutes for a so called soft-boiled egg, i.e. an egg having solid albumin or egg white and warm but substantially liquid yolk. Furthermore, usually the water needs to be heated to the required temperature, which takes additional time. Many methods and apparatus have been proposed for properly boiling an egg more swiftly. Some of these methods use microwave radiation. When using a microwave oven for cooking an egg as such, the egg may explode inside the oven or, even worse, in the hands or face of the consumer. Thus, methods were devised for cooking an egg in a microwave oven while preventing the egg from exploding.

For instance, a method is proposed, in which an egg is first shelled and its contents are put in a small container, in which the egg is subsequently boiled in a conventional microwave oven in about 60 seconds. The end result often is a too hard or rubbery albumin. Often, the egg white is not cooked uniformly. In professional kitchens, the result of this method is not acceptable.

In another known method, the egg in unbroken state is placed in an electrically conducting holder filled with a small amount of water. The holder is subsequently placed in a conventional microwave oven. In about 4-5 minutes, an egg is cooked. The cooking time is not reduced, but it does require less time to boil the water first.

In EP-988795 an egg is placed in a container having walls which are transparent to microwave radiation. The container is filled with hot water of 90° C., and placed in a conventional microwave oven. Subsequently, the egg is placed in the container, and boiled in about 110 seconds.

In EP-992197, an apparatus is presented, in which an egg is boiled in a microwave field, while hot water is poured over an egg (shower).

These methods are complicated, and require additional devices or steps, and additional time to heat up the water.

EP-1.917.867 discloses a package for cooking an egg in a microwave oven. The package comprises a covering adapted to surround an egg, and is arranged to partially transmit microwave radiation and partially absorb microwave radiation. As an example, a medium sized egg is wrapped in a tissue, soaked in 20 ml 0.5M NaCl solution, and a rubber material was used for packaging. The package was placed in a regular commercial microwave oven and subjected to a heating program. This procedure of packaging is laborious and does not allow reproducible results, which is in particular important in consumer applications.

JP60126062 discloses a method for preparing an egg in a microwave oven, in which an egg is placed in a container with water containing 5 gr salt. When subjecting this to 500 W microwave radiation, a hard-boiled egg is prepared in about 390 sec. It is suggested that a soft-boiled egg can be prepared by increasing salt concentration. The suggested preparation time is still long, even longer than just preparing an egg in hot or boiling water. Furthermore, it requires the preparation of salt water with the right amount of salt added.

SUMMARY OF THE INVENTION

The invention aims to provide a high quality cooked egg using substantially less time for preparation.

The invention further and/or alternatively seeks to provide a modified egg which allows for instance a consumer to cook the egg in a short time.

According to a first aspect of the invention this is realized with an apparatus for boiling an egg, said apparatus comprising a device for providing microwave radiation in a confined space, said space further comprising a holder provided with at least one cavity adapted to the shape of an egg with an eggshell, said cavity provided with a first layer surrounding the eggshell, said first layer:
  is in heat exchanging contact with the shell of the egg;
  has a dielectric constant with an imaginary part, $\varepsilon''$, between 20-500 at a temperature between 0° C.-100° C. and at a microwave frequency of 2.45 GHz, and
  having a layer thickness d of 1-6 millimeter and varying less than 30% over the egg, or said holder for holding at least one the egg assembly comprising an egg with an eggshell which is provided with a packaging surrounding the eggshell, said packaging comprising a first layer which enfolds the shell of the egg and is in heat exchanging contact with the shell of the egg, has a dielectric constant with an imaginary part, $\varepsilon''$, between 20-500 at a temperature between 0° C.-100° C. and at a microwave frequency of 2.45 GHz, and has a layer thickness d of 1-6 millimeter and varying less than 30%, and said packaging designed to retain the layer thickness of said first layer while said egg assembly is subjected to said microwave radiation to become a boiled egg.

The apparatus can for instance be designed to prepare one or several eggs at the same time. It allows easy preparation of eggs fast, and with minimal use of energy and waste material. In an embodiment, the apparatus comprises a device for measuring the weight of an egg in a cavity.

The invention further provides a method for cooking an egg using microwave radiation, said method comprising the steps of providing an egg assembly according to the preceding definition, positioning said egg assembly in a space enclosed with substantially microwave-reflecting walls, and subjecting said egg assembly in said space to an amount of microwave radiation common for household microwave oven during 30-180 seconds.

The invention further provides an egg packaging for providing an egg assembly as defined above, said egg packaging comprising a layer of polymer material having a softening temperature of above 130° C., said layer having a inner surface following the contour of an egg, and enclosing an egg completely and liquid tight, said layer further comprising spacers extending from said inner surface for keeping an egg in the centre of the packaging with its shell at about 1-10 mm from the inner surface, and said packaging further comprising a filling opening, allowing the space between an egg and the inner surface to be filled with a liquid.

The current invention allows a so-called soft-boiled egg to be prepared within 180 second. In particular, it allows a soft-boiled egg to be prepared within 120 seconds. This preparation time refers to an average size chicken egg. Usually, a chicken egg will be between about 45-75 gr. A relatively small egg may take shorter time to be prepared, and a relatively large egg can take relatively longer time. The invention allows preparation of an egg with minimal use of energy, without wasting water, and in such a way that a consumer can use it.

In the invention, the properties of the layer are defined with respect to a boiled or prepared egg. In this context, prepared relates to processing an egg in such a way that it becomes a boiled egg. A boiled egg in this context is an egg which usually is anywhere between a hard-boiled egg and a soft-boiled egg. For a soft-boiled egg, an egg usually is prepared in such a way that the albumin is set, in other words, the albumin is solid, and the yolk is warm but still substantially liquid. It is of course also possible to use the method and apparatus for producing at any stage of preparation, for instance an egg with its yolk completely solid or set, i.e. a so-called hard-boiled egg. This usually requires a longer preparation time. The invention allows an egg to be prepared in such a way that its quality is comparable to an egg prepared in hot or boiling water. In particular, this "quality" relates to the taste and texture of the prepared egg.

The egg referred to in this document is usually a chicken egg, although it is also be possible to boil other hard-shelled eggs using the current invention. These eggs may also be prepared in a relatively short time, depending on the type of egg.

Usually, microwave radiation is defined as electromagnetic radiation with a frequency between 1-100 GHz. In particular, in current microwave ovens, the microwave radiation has a means frequency of about 1-10 GHz. In current household microwave ovens, the radiation is about 2-3 GHz. In particular, the microwave radiation allowed in most countries has a frequency of about 2.45 GHz. In this respect, it should be clear that the egg assembly of the current invention comprises a layer with certain properties which are defined at a specific microwave frequency. The egg assembly can, however, also be subjected to microwave frequencies at other ranges in order to obtain a prepared egg. Usually, as 2.45 GHz is an accepted frequency for microwave radiation, that particular radiation is used.

The preparation time depends on the amount of microwave radiation energy to which the egg is exposed. In tests conducted in the current invention, a standard microwave oven was used. This type of microwave ovens supply microwave energy, as explained above. The amount of microwave power supplied is usually expressed in Watt. Most microwave ovens supply a maximum of about 1000-1200 Watts of microwave radiation. In current microwave ovens, the supplied energy can be set to parts of this maximum energy per time. Furthermore, usually the time can be set, in this way the total amount of energy supplied to (usually) a food product in the microwave oven. In the current invention, an egg can be subjected to microwave radiation. In an embodiment, the egg is subjected to microwave radiation having a frequency as referred to above. It is, for instance, conceivable that a specific device is made in which one or more eggs are prepared simultaneously. In this device, the microwave radiation can have any one of the frequencies mentioned above. Using such a specific device allows several eggs to be prepared at the same time, but having different preparation settings, allowing for instance a soft-boiled and a hard-boiled egg to be prepared at the same time. It may even be possible to prepare these different eggs in the same preparation time.

The alternating electromagnetic field generated inside the microwave oven leads to excitation, rotation/collision of polar molecules and ions inside the food. These molecular frictions generate heat and subsequently lead to temperature rise. Two major mechanisms, dipolar and ionic interactions, are responsible for heat generation inside the foodstuffs. In case of dipolar interaction, polar molecules such as water molecules inside the food rotate according to the alternating electromagnetic field. The water molecule is a "dipole" and these "dipoles" will orient themselves when they are subject to an electromagnetic field. The rotation of water molecules will generate heat for cooking. In case of ionic interaction, in addition to the dipole water molecules, ionic compounds (i.e. dissolved salts) in food can also be accelerated by the electromagnetic field and collided with other molecules to produce heat. Therefore, the composition of a food and packaging will affect the rate and uniformity of heating inside the microwave oven. Food with higher moisture content will be heated up faster because of the dipolar interaction. Also, when the concentration of ions, e.g. dissolved salts, increases, the rate of heating also increases because of the ionic interaction with microwaves.

In order to account for the various heating mechanisms (termed loss mechanisms), the dielectric constant for a real dielectric attains a complex form $$\varepsilon^* = \varepsilon'' + j \cdot \varepsilon''$$

The imaginary part $\varepsilon''$ is termed the effective loss factor, and accounts for dipolar relaxation loss as well as conduction (and also for Maxwell-Wagner losses, which are important only at lower frequencies). In general, $\varepsilon''$ is a function of the temperature, the composition and moisture content of a material, and the distribution of the electric field in the material and in the microwave oven. In the current invention, $\varepsilon''$ may be defined by using subscripts in which i is the temperature and j the frequency of the microwave radiation. Thus, $\varepsilon''_{60° C, 2.45 GHz}$ refers to the value of $\varepsilon''$ of a substance at a temperature of 60° C. and at a microwave frequency of 2.45 GHz. Thus, in the current context, it does not mean that the material is only to be subjected to those conditions, but that the material has a certain $\varepsilon''$ value at that specified temperature and that specified frequency.

In this invention, the packaging may be a more or less permanent envelope enclosing the egg. Thus, after preparation the packaging must be broken or removed together with the egg shell in order to use or eat the boiled egg. The packaging may be provided with measures which facilitate removal. Thus, the packaging may be provided with a weakening line allowing removal of for instance the top of the packaging. In an embodiment, the first layer has a combination of layer thickness d and $\varepsilon''$ selected from the area bounded by the curves:

$$\varepsilon''(d) = 229 \cdot d^{-1.168}, \varepsilon''(d) = 2989 \cdot d^{-2.237} \text{ and } \varepsilon''(d) = 300$$

for an egg of between 45 and 75 gr, allowing said egg to become a boiled egg in less than about 120 s when subjected to microwave radiation. Experiments showed that in fact the combination of material property and layer thickness provided the right condition for preparing an egg in microwave radiation. In fact, the $\varepsilon''$ in this embodiment is the average value of ε" during the boiling process. In practice, it will almost equal the value of ε" at 60° C. Again, this ε" is defined at 2.45 GHz.

The packaging of the invention comprises a first layer and is designed to retain the layer thickness of said first layer while said egg assembly is subjected to said microwave radiation to become a boiled egg. To that end, in an embodiment the first layer may be heat resistant such that it does not deform at a temperature of up to about 130° C. Alternatively, the packaging may comprise an outer layer which enfolds the first layer and which does not deform at a temperature of up to about 130° C. The outer layer may further be water tight. In an embodiment, the outer layer is a polymer layer. In an embodiment the outer layer is less than 2 mm thick. Such a layer can for instance be from polypropylene (PP), PET, of a similar plastic material.

A suitable material for a layer of the packaging is salt water. For instance, the layer may comprise a saline solution of water confined in a thin layer of packaging material holding the saline solution of water in a defined layer around an egg. Alternatively, a matrix material may hold the water. For instance a fibrous materials can be used for water retention and mechanical stability of the packaging as an embodiment of this invention.

In an embodiment, the first layer comprises solid materials which retain their layer thickness during boiling of the egg. For instance, such materials as clays and (hydro-) gels, possessing the dielectric properties claimed above, and making a firm thermal contact with an egg. An example of such a gel material is polyacrylamide gels (PAAM) known for their mechanical stability up to temperatures of about 230° C., and having ε" in the range of 10-200 when ions are added. In an embodiment, polyacrylamide gel (PAAM) doped with $K_2CO_3$ or $Na_2CO_3$ can be used.

In an embodiment, aqueous solutions of salts other than NaCl can be used in the packaging to achieve the same results, provided that the dielectric properties and thickness of the packaging layer are in the ranges covered by this invention.

The first layer can be part of a layer assembly enveloping the egg. The layer assembly in that embodiment comprises a contact layer positioned between the first layer and an egg shell. The contact layer is flexible in order to follow the shape of the egg. It further allows a heat exchanging contact between the first layer and the egg shell. In an embodiment, it is microwave transparent. Furthermore, it is heat stable up to at least 130° C. The invention further relates to a method for cooking an egg, comprising the steps of:

providing said egg with a layer which envelops said egg, which layer is in heat exchanging contact with the shell of the egg, has a dielectric constant with an imaginary part, ε", between 20-500 at a temperature between 0° C.-100° C. and at a microwave frequency of 2.45 GHz, and which layer has a layer thickness d of about 1-6 millimeter;

determining a weight of said egg;

based on said weight and based on said layer properties and a desired cooking grade of said egg, determining cooking parameters based upon microwave energy and cooking time;

subjecting said enclosed egg to microwave radiation;

determining during said cooking the temperature of the egg at various moments;

adjusting a cooking time or an energy of said microwave based upon the determined temperature values.

The layer can for instance be provided by placing the egg in an apparatus as described above. The weight can be determined. Equivalent to that, the volume can be determined for instance and this value can be used. The determined temperature can be used, for instance, to calculate the absorbed energy. Thus, the additional energy needed to prepare the egg in the desired way can be calculated. The additional energy allows calculation of the additional cooking time and/or microwave energy or the combination of both. There are other, equivalent control schedules possible based on this example.

In the method, cooking time can be set as a fixed parameter, or alternatively, the microwave radiation energy or power can be a fixed value. The energy can for instance be controlled by switching the microwave on and off during some seconds when the temperature rises too fast or its value is too high.

The invention further applies to an apparatus comprising one or more of the characterizing features described in the description and/or shown in the attached drawings. The invention further pertains to a method comprising one or more of the characterizing features described in the description and/or shown in the attached drawings.

The various aspects discussed in this patent can be combined in order to provide additional advantages. Furthermore, some of the features can form the basis for one or more divisional applications

DESCRIPTION OF THE DRAWINGS

The invention will further be elucidated, referring to an embodiment of an egg assembly and a packaging for an egg shown in the attached drawings, showing in.

DETAILED DESCRIPTION OF EMBODIMENTS

Figure 1:
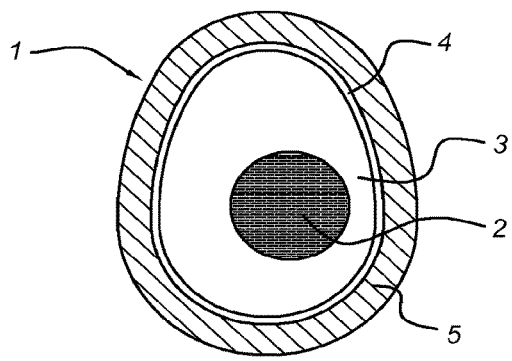
FIG. 1 a cross section of an egg with enfolding layer.

In FIG. 1, a cross section through an egg assembly adapted to be prepared in a conventional microwave oven is shown. The egg 1 has a yolk 2, albumin 3, and a shell 4. Enclosing the shell, the egg is provided with a packaging which in this embodiment consists of a single layer 5 which completely enfolds the egg 1. This layer 5 is here in a firm thermal contact with the shell 4. In order to prevent an egg from exploding while subjected to microwave radiation, and at the same time allowing swift preparation of an egg, it was found that the layer which is in contact with the egg shell should have a dielectric constant with an imaginary part, ε", in a certain range, explained below.

In an embodiment, the layer 5 can comprise a layer of water-retaining matrix material. An example of such a matrix material is a fibrous layer capable of absorbing water. Other examples of such matrix material are a hydrogel, for instance. The layer 5 is such that when soaked with water it results in a layer with the thickness of about 1-5 mm. In an embodiment, such a layer is soaked with salt water containing 0.4-0.5 M NaCl.

In an alternative embodiment, the layer comprises a water-retaining matrix material holding a salt, for instance NaCl, in a substantially solid form. In a layer of between 1-5 mm of water-retaining material, about 1 gr of salt will generally be present. In an embodiment, the salt will be uniformly distributed. Before use, an egg with such a layer is to first brought into contact with some water which it will soak. Next, it is placed in a microwave oven and prepared. The matrix material or any material enclosing it should be such that the layer thickness remains almost the same during the boiling process.

In order to maintain the properties of layer 5, the packaging can comprise a further, outer layer (not shown in the drawing). To that end, the outer layer can have one of the following properties. It can be designed to retain the thickness of the layer 5 during boiling of the egg. If the layer 5 comprises a water retaining matrix material, it can also be a watertight layer in order to prevent the water to escape during boiling of the egg. In an embodiment, the outer layer is a plastic material enfolding the layer 5 and having a thickness of less than 2 mm.

Alternatively or additionally, in order to diminish influences of the first layer on the egg, for instance its taste, a contact layer can be present between the egg shell and the first layer. Via this contact layer, the first layer is in heat exchanging contact with the egg shell. The contact layer prevents the first layer, or (salt) water or other components in the first layer, to come into direct contact the egg shell. The contact layer in an embodiment is an elastomeric layer following the shape of the egg it encloses. It thus allows thermal contact between the first layer and the egg shell.

Figure 2:
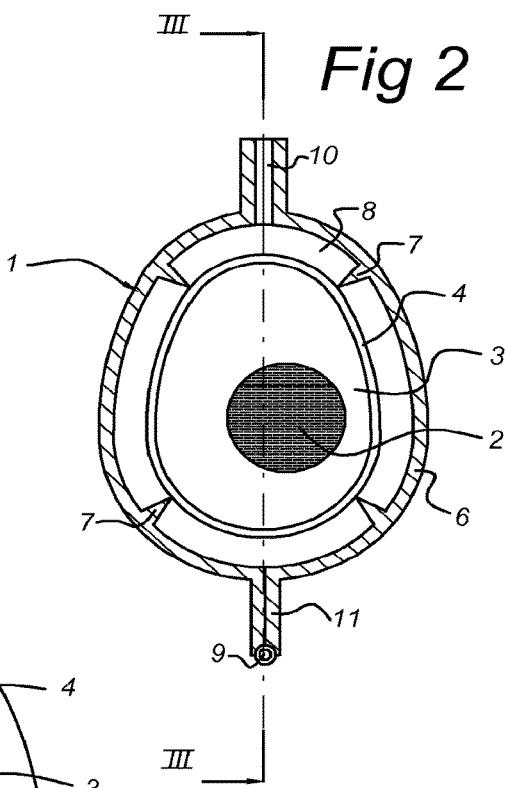
FIG. 2 a longitudinal cross section of an egg with alternative enveloping layer, and FIG. 3 a transverse cross section of the egg of FIG. 2
Figure 3:
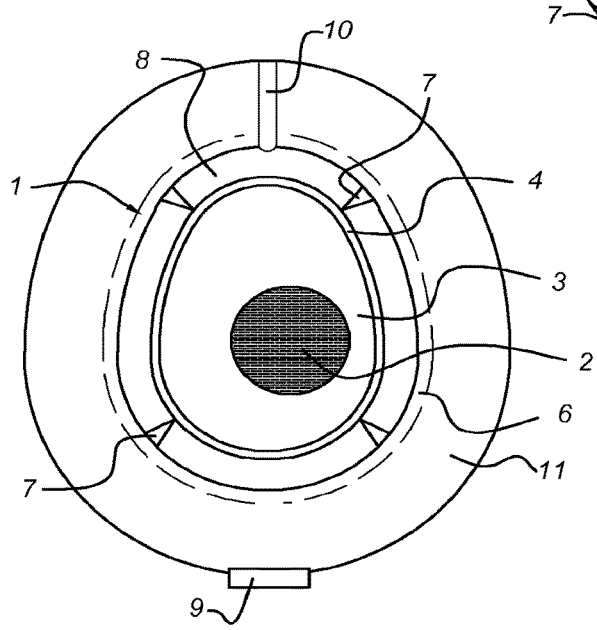

In FIGS. 2 and 3, an alternative way of providing a layer around an egg, which allows preparation of an egg using microwave radiation, is shown. This embodiment provides a packaging for an egg. In this embodiment, the packaging provides a layer 6 of material. This layer 6 is shaped to have an inner surface following the contour of the shell 4 of the egg. This surface is at a distance from the eggshell of the egg. Thus, it allows the provision of a uniform cavity 8 around the shell 4 of the egg. In order to provide a uniform cavity, i.e. to make the distance between the inner surface of the layer 6 and the outer surface of the shell 4 of the egg as uniform as possible, the packaging is provided with spacers 7 on the layer 6. These spacers 7 keep an egg substantially centred in the packaging, thus providing a substantially uniform cavity 8 around the shell 4 of the egg. In use, the cavity can be filled with a material which has the properties defined above. In an embodiment, the packaging has two parts which are connected via a hinge 9. Thus, the packaging can be hinged open, an egg can be placed in the packaging, and the packaging can be closed around the egg. Filling opening 10 is shown in the drawing. In an embodiment, a closed rim 11 (FIG. 3) provides a liquid-tight closure of the packaging. In a further embodiment, a part of the closing rim 11 can provide a sealable conduit with a filling opening 10 for filling the uniform cavity 8 with a liquid having the properties, in particular the imaginary dielectric constant, described above.

In an embodiment, the packaging is substantially made from a polymer material having a softening temperature of at least 130 degrees Celsius. An example of such a polymer material is PET, polyethylene terephthalate. In such an embodiment, the packaging can be formed from a sheet of this polymer material in a deep-drawing process. The latter process as such is well known in the art, and will not be explained further in this description. In such an embodiment, a hinge may be formed as a thinned line of material, allowing two parts to hinge. It thus forms a living hinge. In a particular embodiment, the spacers 7 may be formed as parts of the layer of polymer material which bulges inward.

In operation, such a packaging is opened, an egg is placed inside, and the packaging is closed again. Next, via a sealable filling opening the cavity 8 is filled with a liquid material having the properties described in this document. In an embodiment, the distance between the inner surface of the layer and the egg shell 4, i.e. the width of the cavity, is between about 2-4 mm, in particular about 3 mm. This cavity can be filled with a liquid having a dielectric constant with the imaginary part mentioned above. As an example, it can be filled with water having about 0.4-0.5 M NaCl. This packaging thus prepared can be placed in an ordinary household microwave oven. Next for preparing a soft-boiled egg, this is subjected to a program for instance of 70 seconds at 800 Watt and about 20 seconds at 560 Watt. Thus, it is possible to prepare a soft-boiled egg in about 80 seconds.

Figure 4:
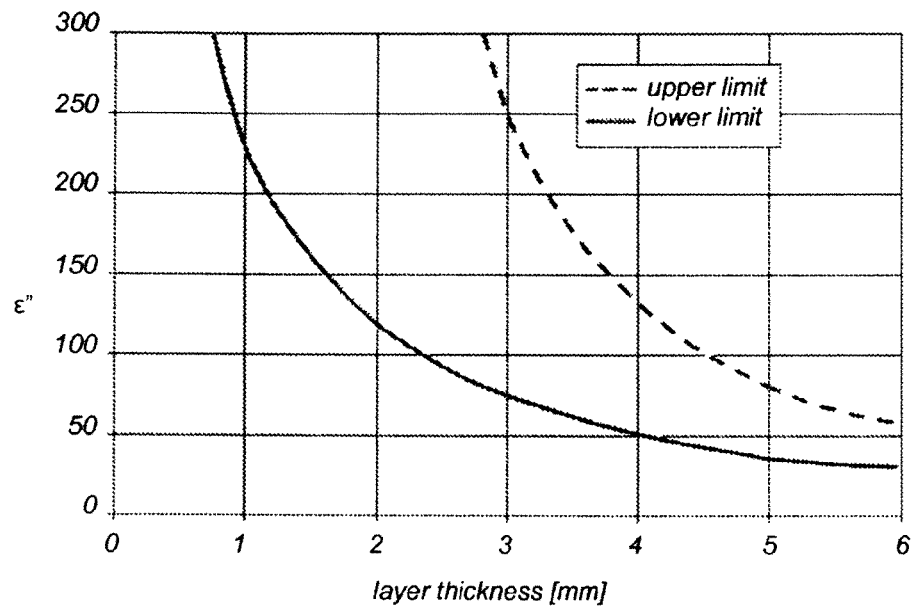
FIG. 4 a graph showing the effect of weight of an egg, and layer parameters.

In the current invention, it was found that in order to prepare an egg in microwave radiation, it requires a packaging comprising a first layer having certain well defined properties. It was found that the right properties of this layer prevent the egg from exploding in a microwave oven. In fact, it was found that the relation between layer thickness and $\varepsilon''$, the imaginary part of the dielectric constant, is of importance. FIG. 4 shows the results of calculations giving the upper range and lower range of the relationship between $\varepsilon''$ and layer thickness for which it is possible to prepare an egg using microwave radiation. Please note that the value of $\varepsilon''$ in the graph is defined at 2.45 GHz. In fact, the area between these curves is the area in which $\varepsilon''$ and layer thickness d should be in order to allow a chicken egg of between about 45 gr and 75 gr to be prepared within 120 seconds. Within this area, for instance a material with a certain $\varepsilon''$ can be linked to a layer thickness. In fact, the lower limit relates to the combinations of $\varepsilon''$ and layer thickness which is close to the properties which allow a 45 chicken gr egg to be hard-boiled in about 100 seconds. The upper limit relates to the combinations of $\varepsilon''$ and layer thickness which little above to the properties which allow a 75 gr chicken egg to be soft-boiled in about 120 seconds. In equations, the lower limit can be represented by $\varepsilon''(d)=229 \cdot d^{-1.168}$ and the upper limit can be represented by $\varepsilon''(d)=2989 \cdot d^{-2.237}$. The area is further limited by, $\varepsilon''(d)=300$.

In fact, it was found that a 45 gr egg, for instance a small chicken egg, can be soft-boiled in about 80 seconds when layer 5 has a layer thickness d and $\varepsilon''$ selected from an area with a lower limit $\varepsilon''(d)=380 \cdot d^{-1.25}$ and the upper limit can be represented by $\varepsilon''(d)=1600 \cdot d^{-2}$. In this range, $\varepsilon''(d)<300$. On the other hand, a 75 gr egg, for instance a large chicken egg, can be soft-boiled in about 120 seconds when the layer thickness d and $\varepsilon''$ selected from an area with a lower limit $\varepsilon''(d)=1600 \cdot d^{-2}$ and the upper limit can be represented by $\varepsilon''(d)=2989 \cdot d^{-2.237}$. In this range, $\varepsilon''(d)=300$ again limits the area.

Figure 5:
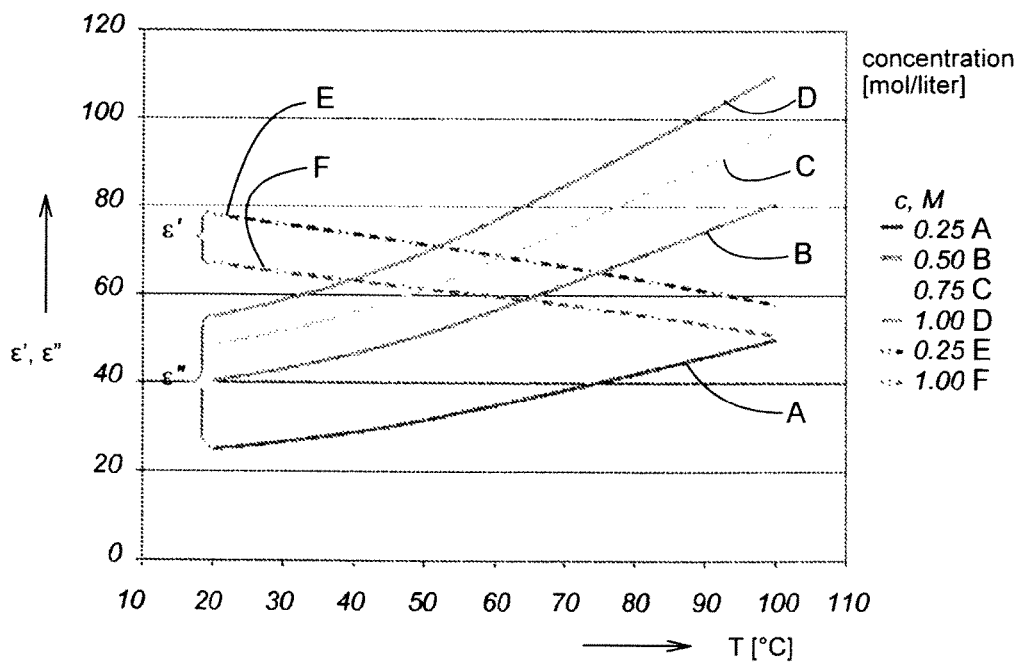
FIG. 5 a graph showing the ε" of salt water as a function of temperature.

FIG. 5 shows a curve indicating the relationship between temperature, $\varepsilon''$ and molarity of salt or saline water, i.e. water having the indicated molarity of NaCl. It shows that the relationship between temperature, $\varepsilon''$ and molarity is complex and non-linear. It thus illustrates that it is not straight forward to transfer one molarity into another.

In practice, when providing egg assemblies according to the invention to the consumer, the effectiveness of the assembly may be further improved by a proper matching between size (or better yet, weight) of the egg, $\varepsilon''$ of the material provided in the packaging, and layer thickness of the packaging. Furthermore, the layer thickness should vary less than 30%. In that way, it can be possible to provide egg assemblies which can be "boiled" in for instance a microwave oven in a reproducibly way.

Figure 6:
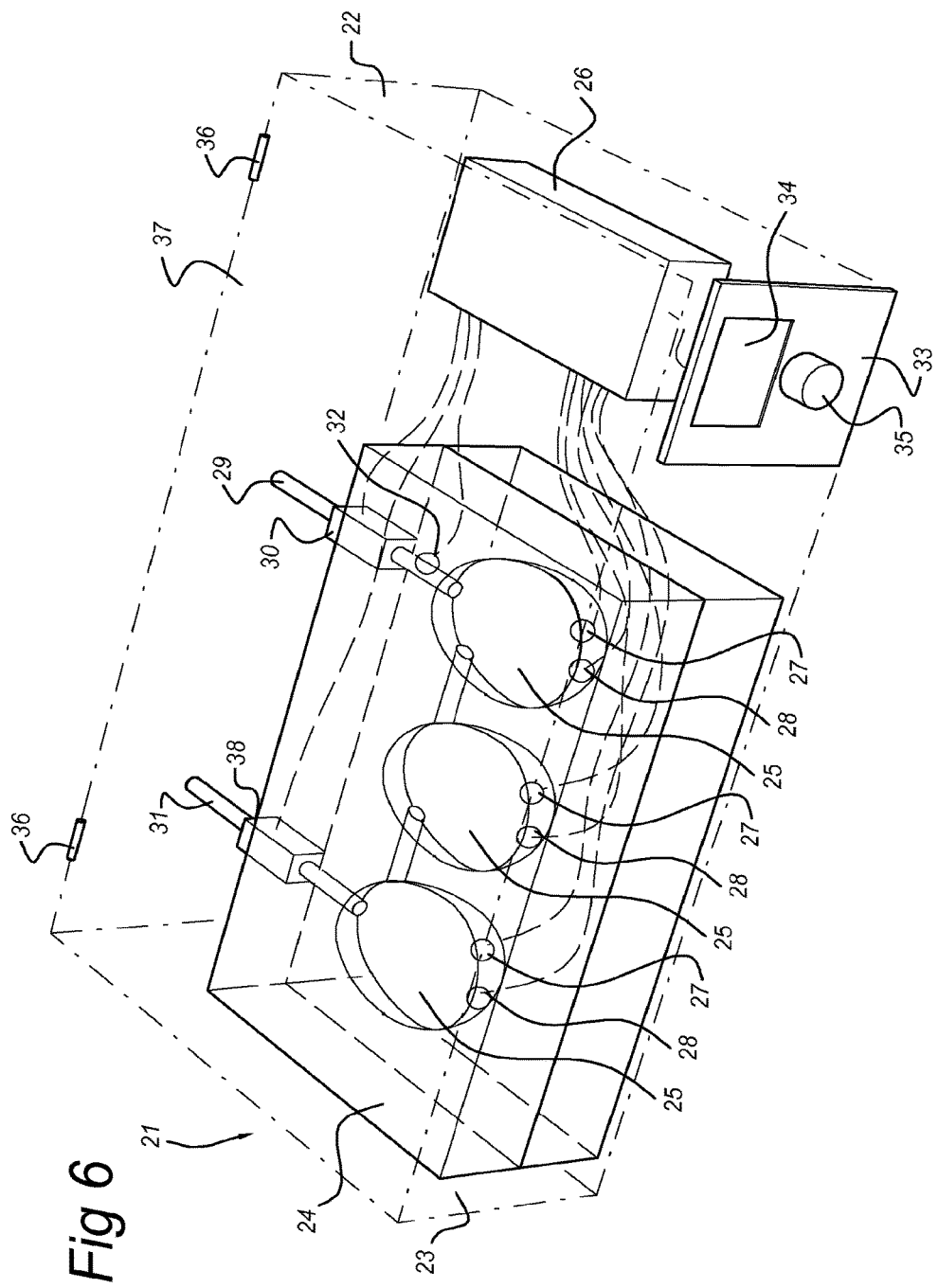
FIG. 6 a drawing of an apparatus for preparing an egg.

FIG. 6 shows a schematic drawing of an apparatus for cooking or boiling or preparing an egg. The apparatus 21 has a housing 22 which has a cavity 23. In this cavity 23 a holder 24 is provided. This holder 24 has at least one cavity 25 in the shape of an egg. In this embodiment, there are two cavities 25. In an apparatus there can be as many as 4 cavities 25 for preparing eggs. The holder 24 provides the layer described above.

The apparatus 21 further has a controller 26 which is operationally coupled to a weight sensor 27 in each of the cavities 25 for determining if an egg is placed in one of the cavities 25. In particular if an egg is placed in one of the cavities 25, it allows for determining its weight. Alternatively, one weight sensor 27 can be provided weighting increase in the weight of the holder 24. As the eggs have about the same weight, it allows determination of the number of eggs in the holder 24. Providing a weight sensor 27 for each of the cavities 25 has an additional advantage in that it allows detection of which of the cavities 25 holds an egg.

The controller is in a further embodiment operationally coupled to a temperature sensor 28 in each of the cavities 25. The temperature sensor 28 first is a safety for preventing overheating of the egg(s). Furthermore, it provides temperature information to the controller 26 during the preparation process for controlling the preparation process. Finally, it measures the temperature of an egg before it is going to be prepared. In that way, the process can be controlled better. The temperature sensor 28 in an embodiment is positioned to contact an egg placed in the cavity 25.

In an embodiment, the apparatus 21 has an inlet 29 for water. In an embodiment, this inlet 29 is attached to a water mains. The inlet 29 in this embodiment is provided with a controllable valve 30 which is operationally coupled to the controller 26. In that way, the controller 26 can arrange for the provision of water in the holder 24. In an embodiment, a further temperature sensor 32 is provided in the inlet 29 for measuring the temperature of incoming water. This water can for instance also be used for cooling an egg after the cooking process.

In a further embodiment, the apparatus 21 has an outlet 31 for water. In an embodiment, this outlet 31 is coupled to a drain. The outlet 31 in this embodiment is provided with a controllable valve 38 which is operationally coupled to the controller 26. In that way, the controller 26 can arrange for removal from holder 24 of the water after use.

In an embodiment, the apparatus further has a input part 33 through which the desired state of preparation of the egg can be entered. This input part 33 is operationally coupled to the controller 26. For instance, a selection switch 35, knob, or push button 35 can be provided which has several settings, for instance three settings for selecting a soft, medium or hardboiled egg. Display 34 is operationally coupled to the controller 26 and can display for instance settings of selector means 35, but also remaining preparation time. Furthermore, the apparatus can sound an alarm when the eggs are ready.

In the embodiment, the housing has hinges 36 for a lid 37, enabling opening of the microwave cavity 23. The holder 24 in this embodiment has two parts thus allowing access to the cavities 25 in order to place or remove eggs.

Based on the weight, measured temperatures and selection on the input part 33, the controller sets the amount of microwave energy needed to prepare egg in the desired way.

Controller 26 may also calculate a preparation time. Furthermore, the apparatus 21 can have display 34 showing for instance the remaining time for preparing the one or more eggs in the holder 4.

In operation, lid 37 is opened providing access to the holder 24. For instance hinging the two parts of holder 24 apart provides access to the cavities 25. Next, eggs can be placed in the cavities 25. The holder 24 and the lid 37 are closed, and a user operates selection switch 35 in order to set the way the eggs need to be boiled. The controller 26 operates the valve 30 to allow water via inlet 29 to access the holder 24. The holder 24 is further provided with for instance salt in a matrix in order to be mixed into the water to provide the first layer having the parameters required. It will be clear that said first layer being in heat exchanging contact also means that a thin layer of material which is transparent to microwave radiation, or almost transparent to microwave radiation, can be present between the first layer and the egg shell. Thus, holder 4 can be a hollow material having a space which provides, when filled with salt water as defined above, the firsts layer inside holder 4, enveloping or enfolding the egg, and in heat exchanging contact with said egg. Alternatively, in order to diminish influences on the egg which may influence taste, a contact layer, also discussed above, can be present between the egg shell and the first layer. Via this contact layer, the first layer is in heat exchanging contact with the egg shell. The contact layer prevents the first layer, or (salt) water from the first layer, to contact the egg shell.

After or while filling the cavity 25 in the holder 24 with water, controller 26 determines the size of the eggs present, the desired cooking selection, the temperature of the eggs and the temperature of the water. From these parameters controller 26 can be able to calculate the required microwave power and cooking time. Controller 26 starts the cooking process, in an embodiment meanwhile monitoring the temperature of the eggs in order to prevent overheating and to follow the process. If required, and in an embodiment, controller 26 can adjust the power of cooking time depending on measured parameters. Thus, it may be possible to use eggs that are less strictly selected. Alternatively, demands on the layer around the eggs can be less strict. Controller 26 can also display the remaining time on display 34. Using the apparatus, eggs may be prepared in about 60-180 seconds. It was found that a selection of M-class eggs would be enough to result in a good preparation result. M-class eggs are selected eggs having a weight of between about 53-63 grams. Thus, the apparatus would allow for instance a range of eggs to be prepared in a reproducible way, even by ordinary consumers. Thus, the apparatus can be designed for preparing M-class eggs.

Figure 7:
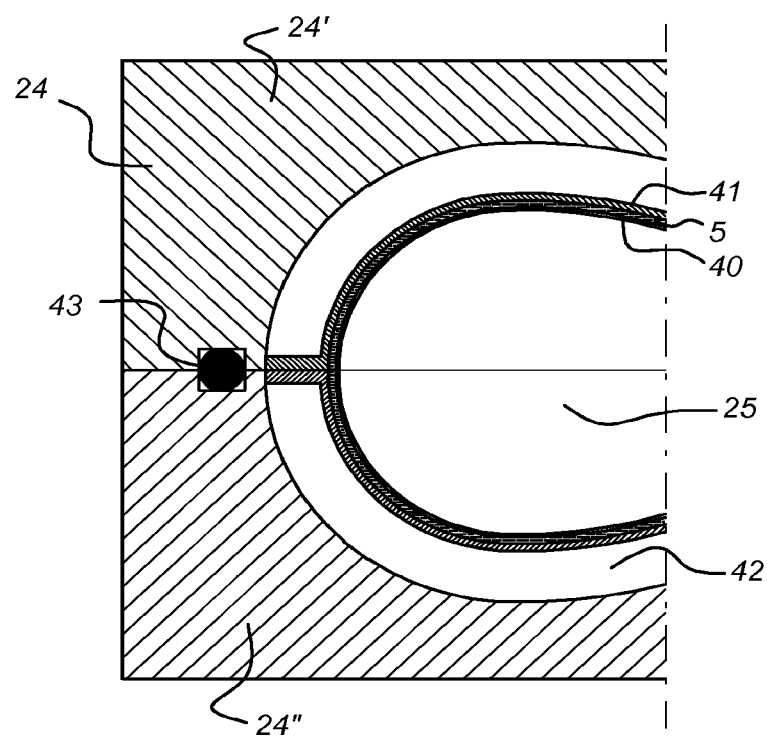
FIG. 7 a schematic side view of an embodiment of a holder for the apparatus of FIG. 6.

FIG. 7 shows an embodiment of a holder 24 capable of holding at least one egg in the apparatus 21. The holder 24 in this embodiment has a first half 24' and a second half 24", allowing access to the egg cavity 25. It is clear that other provisions are possible to allow access to the egg cavity 25. The egg cavity 25 in this embodiment has an ell enclosing layer assembly comprising in this embodiment naturally the first layer 5. The layer assembly further comprises a contact layer 40 to be positioned between the first layer 5 and the egg. The layer assembly can further comprise an outer layer 41. In this embodiment, the layer assembly is positioned in the egg cavity 25 in such a way that a space 42 remains between the outer layer 41 and the inner wall of the holder 24 defining the egg cavity 25. Surrounding the egg cavity 25 in order to seal it, a sealing ring 43 can be provided. The layer assembly in the egg cavity 25 can be permanently connected to the holder 24. In an embodiment, it is replaceable. Thus, it can be used many times, or alternatively a disposable layer assembly can be used.

The material of the holder 24 is permeable to microwave radiation and absorbes as little microwave radiation as possible. It can be largely made from a plastic material. The layer assembly is held inside the egg cavity 25. Egg cavity 25 is shaped in such a way that every shape of egg in a certain weight class of eggs fitted with the layer assembly fits within said egg cavity 25, preferably with little space remaining. In the drawing, the remaining space 42 is represented larger than it will usually be.

Contact layer 40 is flexible, in order to be able to follow the shape of different eggs. In particular, it is rubbery or an elastomeric material. Thus, enclosure of air between the egg shell and the contact layer should be prevented as much as possible. The contact layer 40 prevents liquids from the first layer 5 from contacting an egg held in the layer assembly. The contact layer 40 further allows a heat exchanging contact between the first layer 5 and an egg shell of an egg. In order to be able to withstand the temperatures of cooking or preparing an egg, the contact layer should be heat stable up to a temperature of about 130° C. In an embodiment, the contact layer is a silicone polymer layer, or an alternative elastomeric material.

The outer layer in an embodiment is flexible, preferably even elastomeric, though it may be a little more ridged than the contact layer 40. It too like the contact layer 40 is transparent to microwave radiation. It also is stable up to a temperature of about 130° C.

In an embodiment, the first layer 5 provided between the contact layer 40 and the outer layer 41 is a layer of salt water described above. Alternatively, it is a hydrogel or another material having the properties mentioned earlier in this description. In an embodiment, the first layer 5 is in contact with the water supply or inlet described above.

In an embodiment, via the inlet 29 and using the controllable valve 30, it is possible to add more or less water and thus to modify properties of the first layer. It is, for instance, possible to modify the layer thickness for instance by providing more or less water. It is even possible to modify in that way the $\varepsilon''$ of the first layer. Thus, using measure weight of each egg, the controller can modify the first layer properties to allow preparation of an egg within the short time defined above.

It will also be clear that the above description and drawings are included to illustrate some embodiments of the invention, and not to limit the scope of protection. Starting from this disclosure, many more embodiments will be evident to a skilled person, which are within the scope of protection, and the essence of this invention and which are obvious combinations of prior art techniques and the disclosure of this patent.

The invention claimed is:

1. A method for cooking an egg with an eggshell, by means of an apparatus, comprising the steps of:
   placing a hard-shelled egg in a first part of a holder;
   closing the holder by means of a second part of the holder so that the hard-shelled egg is placed in an egg cavity defined by the parts of the holder;
   the parts comprising inner surfaces adapted to the shape of the hard-shelled egg, the inner surfaces follow the contour of the shell of the hard-shelled egg in the egg cavity at a distance thereof of 1-6 millimeter, the distance varies less than 30% over the contour of the shell of the hard-shelled egg and defines a space between the hard-shelled egg in the egg cavity and the inner surfaces of the parts;
   filling the space between the hard-shelled egg and the inner surfaces of the parts with a liquid through a filling opening in at least one of the parts,
   the liquid forming a packaging surrounding the hard-shelled egg, which packaging comprises a layer being in heat exchanging contact with the shell of the hard-shelled egg and has a dielectric constant with an imaginary part, $\varepsilon''$, between 20-300 at a temperature between 20° Celsius and 100° Celsius and at a microwave frequency of 2.45 GHz;
   said layer has a combination of a layer thickness d and the imaginary part $\varepsilon''$ of the dielectric constant selected from the area bounded by the curves: $\varepsilon''(d) = 229 \cdot d^{-1.168}$, $\varepsilon''(d) = 2989 \cdot d^{-2.237}$ and $\varepsilon''(d) = 300$ for an egg of between 45 and 75 gr, allowing the hard-shelled egg to become a cooked egg in less than about 120 seconds when subjected to microwave radiation;
   providing the microwave radiation in a confined space in which the holder is mounted;
   cooking the hard-shelled egg.

2. A method according to claim 1, comprising the steps of:
   determining a weight of the hard-shelled egg;
   based on the weight and based on the layer properties and a desired cooking grade of the hard-shelled egg, determining cooking parameters based upon microwave energy and a cooking time;
   subjecting the enclosed hard-shelled egg to the microwave radiation;
   determining during the cooking, a temperature of the hard-shelled egg at various moments;
   adjusting the cooking time or an energy of the microwave based upon the determined temperature values.

* * * * *